(12) United States Patent  
Santoro

(10) Patent No.: US 11,520,100 B2
(45) Date of Patent: Dec. 6, 2022

(54) APERTURED LIGHT GUIDES FOR LUMINAIRES

(71) Applicant: Lumenpulse Group Inc./Groupe Lumenpulse Inc., Surrey (CA)

(72) Inventor: Scott Santoro, Delta (CA)

(73) Assignee: LMPG INC.

( * ) Notice: Subject to any disclaimer, the term of this patent is extended or adjusted under 35 U.S.C. 154(b) by 0 days.

(21) Appl. No.: 17/267,776

(22) PCT Filed: Sep. 19, 2019

(86) PCT No.: PCT/CA2019/051336
§ 371 (c)(1),
(2) Date: Feb. 10, 2021

(87) PCT Pub. No.: WO2020/056515
PCT Pub. Date: Mar. 26, 2020

(65) Prior Publication Data
US 2021/0325595 A1 Oct. 21, 2021

Related U.S. Application Data

(60) Provisional application No. 62/735,151, filed on Sep. 23, 2018.

(51) Int. Cl.
*F21V 8/00* (2006.01)
(52) U.S. Cl.
CPC ......... *G02B 6/0045* (2013.01); *G02B 6/0036* (2013.01)
(58) Field of Classification Search
CPC ............................ G02B 6/0045; G02B 6/0036
See application file for complete search history.

(56) References Cited

U.S. PATENT DOCUMENTS

| 7,188,989 B2 * | 3/2007 | Miyashita | G02B 6/002 362/621 |
| 7,654,679 B2 * | 2/2010 | Mezouari | G01D 11/28 362/23.01 |
| 10,094,970 B1 * | 10/2018 | Chang | G02B 6/0068 |
| 2004/0096182 A1 * | 5/2004 | Yamashita | G02B 6/0018 385/146 |
| 2008/0285310 A1 | 11/2008 | Aylward et al. | |

(Continued)

FOREIGN PATENT DOCUMENTS

| EP | 3369985 A1 | 9/2018 |
| JP | 2016167425 | * 9/2016 |
| WO | 2012058304 A2 | 5/2012 |

*Primary Examiner* — Fatima N Farokhrooz
(74) *Attorney, Agent, or Firm* — Oyen Wiggs Green & Mutala LLP

(57) ABSTRACT

A light guide is provided. The light guide includes a planar body with a first light receiving surface, a light transmission region in optical communication with the first light receiving surface, and an aperture having an inner circumferential wall defining a light emission region, the inner circumferential wall having a plurality of vertically extending flutes. Substantially all light received at the light receiving surface internally reflects through the transmission region before extraction at the emission region. A luminaire is also provided. The luminaire includes a housing, a light guide as described herein, and a plurality of point light sources in optical communication with the light receiving surface of the light guide.

20 Claims, 13 Drawing Sheets

(56) References Cited

U.S. PATENT DOCUMENTS

| | | | |
|---|---|---|---|
| 2009/0059553 A1* | 3/2009 | Lin | G02B 6/0068 362/23.09 |
| 2009/0237593 A1* | 9/2009 | Hoshi | G02B 6/0021 349/62 |
| 2011/0199753 A1* | 8/2011 | Ramer | F21K 9/62 313/503 |
| 2011/0235362 A1* | 9/2011 | Liu | G02F 1/133606 362/609 |
| 2019/0023176 A1* | 1/2019 | Ishizaka | G02B 6/002 |
| 2020/0374995 A1* | 11/2020 | Bretschneider | H05B 47/11 |

* cited by examiner

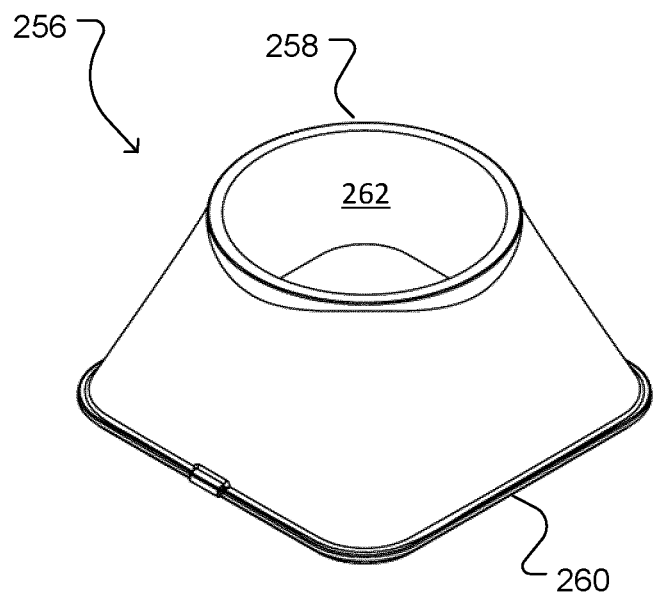
Figure 13
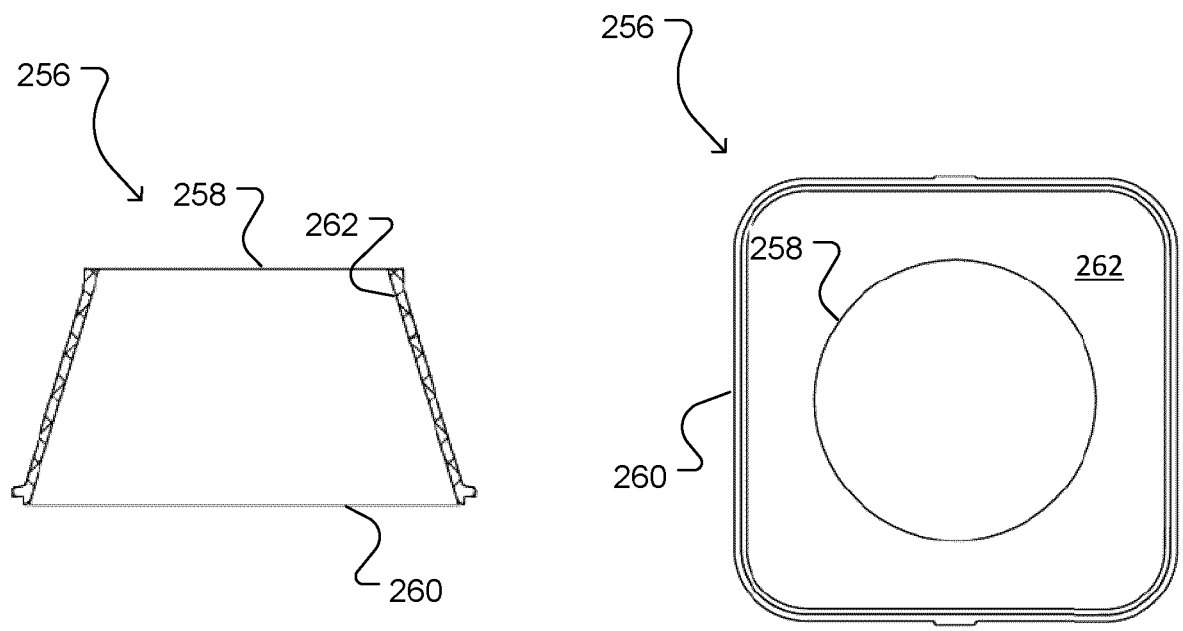
Figure 14
Figure 15

APERTURED LIGHT GUIDES FOR LUMINAIRES

REFERENCE TO RELATED APPLICATIONS

This application is a national phase entry of Patent Cooperation Treaty Patent application No. PCT/CA2019/051336 filed 19 Sep. 2019, which claims priority to and the benefit of U.S. Provisional Patent Application No. 62/735,151 filed 23 Sep. 2018. The foregoing applications are hereby incorporated by reference herein in their entireties for all purposes.

TECHNICAL FIELD

This invention relates to light guides for luminaires.

BACKGROUND

Luminaires can use light guides to transmit light from point light sources such as light emitting diodes (LEDs) to extraction elements where the light is extracted.

One objective in lighting is to provide even illuminance on a work plane, which can be achieved by providing a lighting distribution known in the art as a "batwing" distribution. Another objective in lighting, in certain circumstances, is to provide soft light.

Light guides that provide even illuminance and soft light are desirable.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a light guide. The light guide comprises a planar body with a first light receiving surface, a light transmission region in optical communication with the first light receiving surface, and an aperture comprising an inner circumferential wall defining a light emission region, the inner circumferential wall comprising a plurality of vertically extending flutes. Substantially all light received at the light receiving surface internally reflects through the transmission region before extraction at the emission region.

The inner circumferential wall of the light guide may consist of a plurality of vertically extending flutes. The aperture may be circular, and may comprise an annular lip extending beyond a plane of the bottom surface of the planar body, the annular lip extending the inner circumferential wall and the plurality of vertically extending flutes of the is aperture. A thickness of the annular lip may be no greater than the thickness of the planar body. The annular lip may be integrally formed with the planar body.

The light guide may further comprise a second light receiving surface opposite the first light receiving surface, whereby the aperture is disposed between the first light receiving surface and the second light receiving surface.

The planar body of the light guide may comprise a pair of cutouts, each cutout adjacent a corresponding side of the aperture. A width of the cutouts may be equal to or greater than a diameter of the aperture. The cutouts may narrow in a distal direction, whereby a point of greatest depth of the cutouts aligns with a centerline of the aperture. The cutouts may be triangular. The light guide may comprise an array of apertures, whereby a cutout of an aperture and an adjacent cutout of an adjacent aperture join to form a combined cutout. When the cutouts are triangular the combined cutout may be diamond shaped.

The planar body of the light guide may comprise a plurality of apertures. The plurality of apertures may be aligned along a center point of the apertures. The plurality of apertures may be arranged in increasing size in the distal direction.

Another aspect of the invention provides a luminaire. The luminaire comprises a housing, a light guide as described herein, and a plurality of point light sources in optical communication with the light receiving surface of the light guide.

When the light guide of the luminaire comprises a cutout, the luminaire further comprises a reflector element that corresponds in shape and fits in to the cutout, wherein the reflector element comprises reflective sidewalls.

A bottom surface of each aperture of the light guide of the luminaire may be coupled to a cup, wherein the cup comprises a reflective inner wall. A shape of the top surface of the cup may correspond to the shape of the inner circumferential wall of the aperture. A cross-section of the cup may increase in a direction away from the aperture. The shape of the top surface of the cup may be the same as or different from a shape of the bottom surface of the cup. The cup may have a hollow truncated cone shape.

In addition to the exemplary aspects and embodiments described above, further aspects and embodiments will become apparent by reference to the drawings and by study of the following detailed descriptions.

BRIEF DESCRIPTION OF DRAWINGS

The accompanying drawings illustrate non-limiting example embodiments of the invention.

FIGS. 13 to 15 show top perspective, cross-sectional side and bottom views, respectively, of a cup of a luminaire according to an embodiment.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "proximal" as used herein means a position relatively closer to the light receiving surface of the light guide, and the term "distal" as used herein means a position relatively farther away from the light receiving surface of the light guide.

Aspects of the invention relate to light guides having a planar body. The planar body has an aperture with an inner wall comprising vertically extending flutes. The aperture may have a lip. Incident light travels by total internal reflection from laterally positioned light sources through the planar body and is extracted at the vertically extending flutes. Aspects of the invention also relate to luminaires incorporating such light guides.

Figure 1:
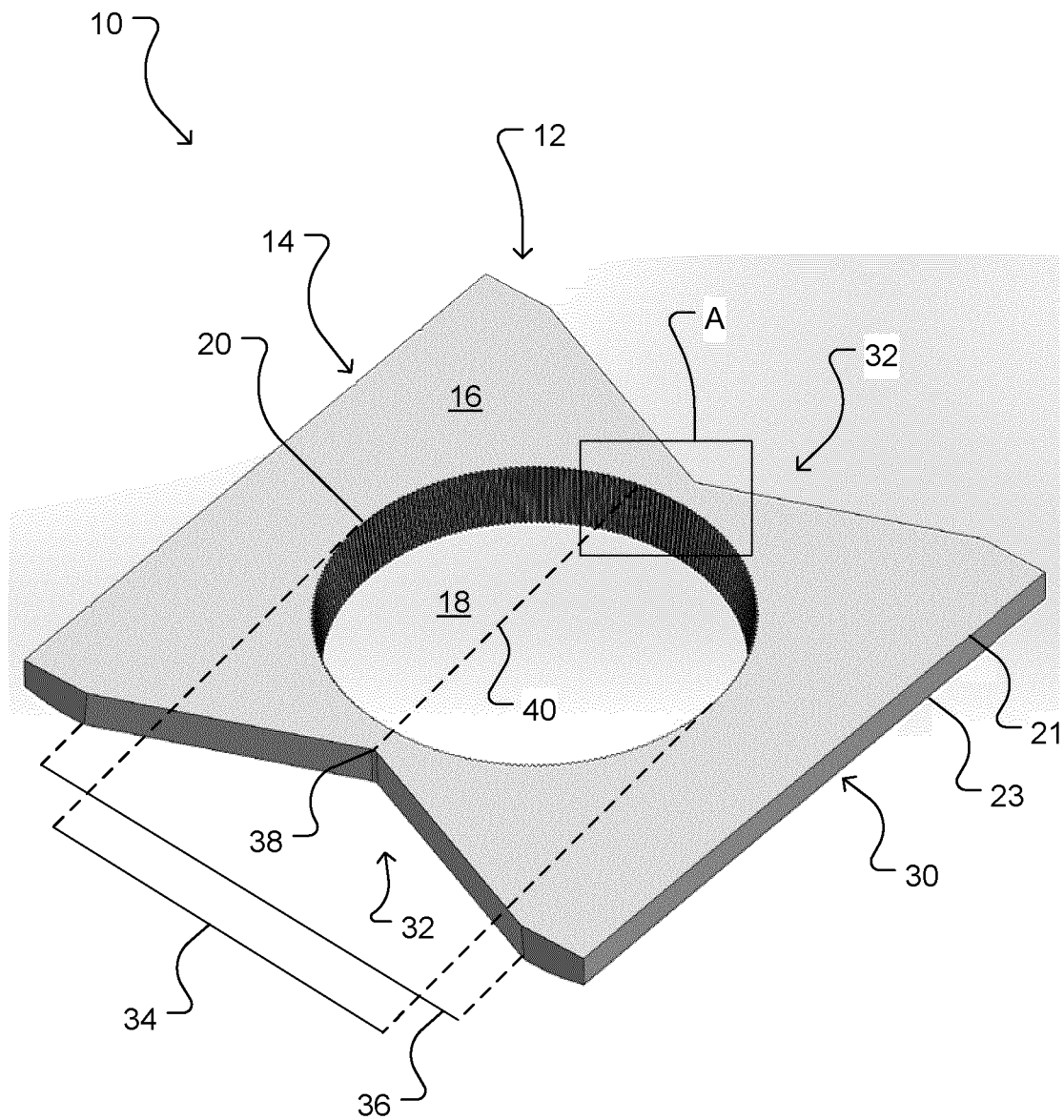
FIG. 1 is top isometric view of a light guide according to an embodiment.
Figure 2:
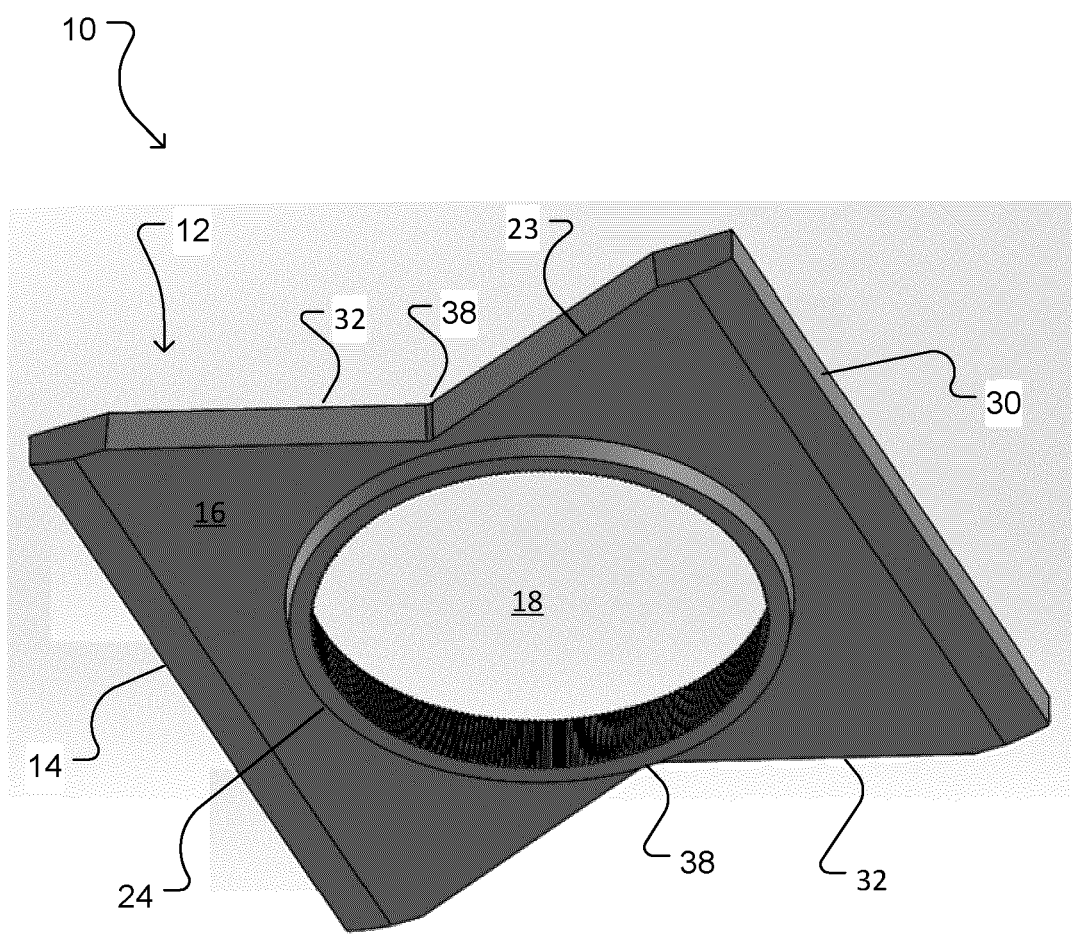
FIG. 2 is a bottom isometric view of a light guide according to the embodiment shown in FIG. 1.
Figure 3:
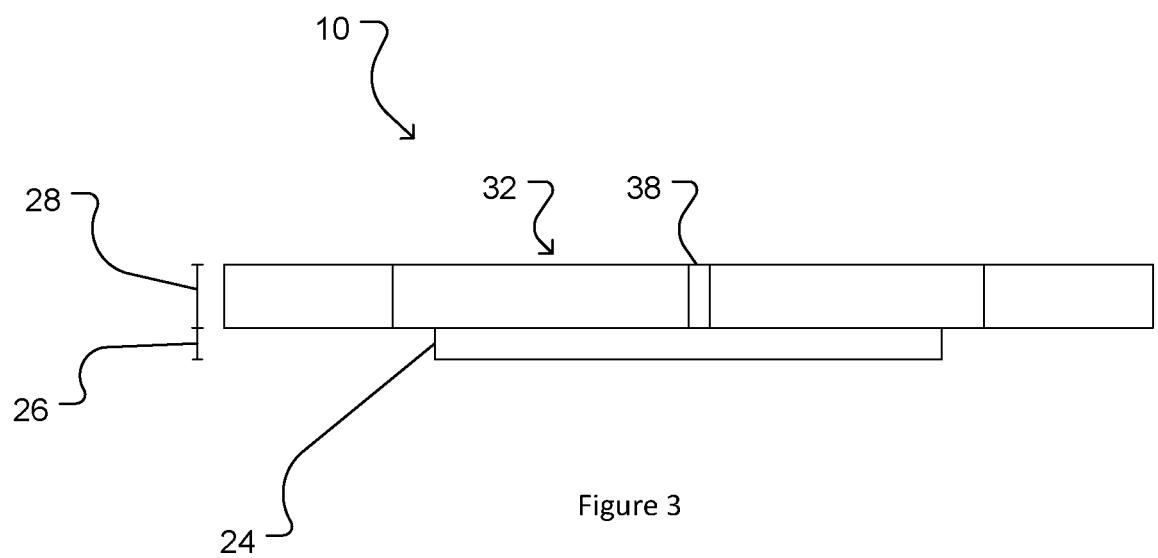
FIG. 3 is a side view of a light guide according to the embodiment shown in FIG. 1.

FIGS. 1 to 3 show a light guide 10 according to an embodiment of the invention. Light guide 10 has a planar body 12. One end of a planar body 12 is a first light receiving surface 14, and at the opposite end is a second light receiving surface 30. Planar body 12 defines a light transmission region 16 in optical communication with each of first light receiving surface 14 and second light receiving surface 30.

Figure 1A:
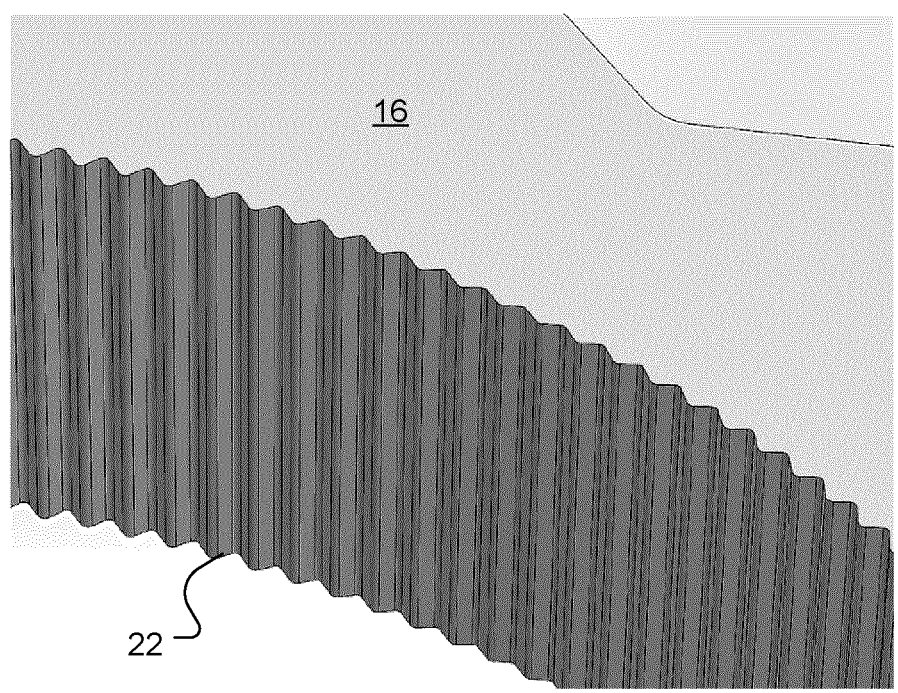
FIG. 1A is a close up view of section A from FIG. 1.

Light guide 10 has an aperture 18 centrally positioned between first light receiving surface 14 and second light receiving surface 30. Aperture 18 may be circular. In other embodiments aperture 18 may be oval or another suitable shape. Aperture 18 has an inner circumferential wall 20 with a plurality of vertically extending flutes 22 that define a light emission region, as best shown in FIG. 1A.

As best shown in FIG. 2, aperture 18 has an annular lip 24 extending beyond a plane of bottom surface 23 of planar body 12. Annular lip 24 downwardly extends inner circumferential wall 20, and therefore flutes 22, of aperture 18. Annular lip 24 may be integrally formed with planar body 12.

Figure 11A:
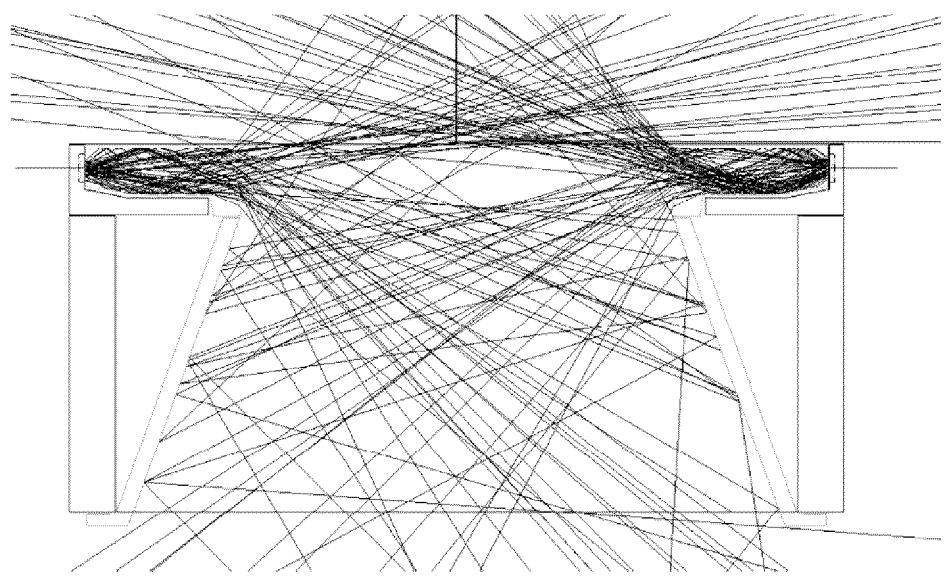
FIG. 11A shows a cross-sectional side view of paths of exemplary light rays internally reflecting and then emitted out of a light guide according to the embodiment shown in FIG. 8.
Figure 11B:
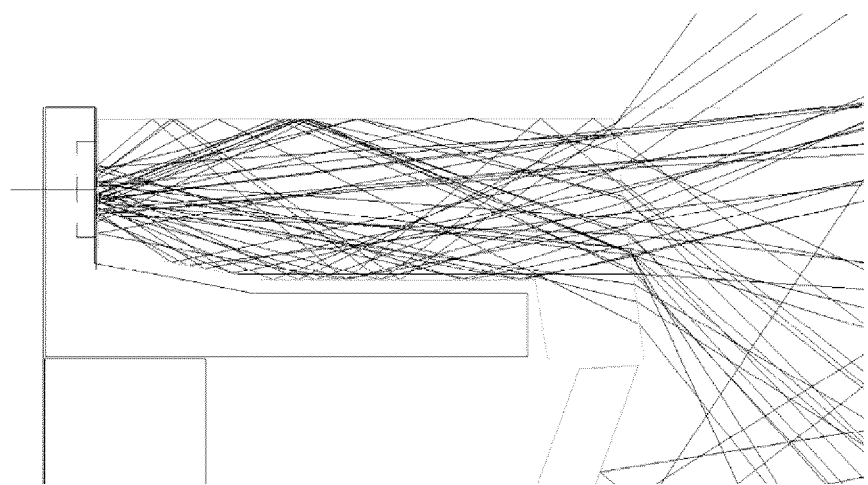
FIG. 11B shows a close up cross-sectional side view of paths of exemplary light rays internally reflecting and then emitted out of an end side of a light guide according to the embodiment shown in FIG. 8.

As best shown in FIG. 11B, annular lip 24 increases the amount of light in the lower hemisphere by removing bottom surface 23 in that area, allowing light which otherwise would have been reflected up by bottom surface 23 to instead continue to travel down to strike and be extracted out from vertically extending flutes 22 of inner circumferential wall 20. Because such light rays are travelling downward they are released downward into the lower hemisphere.

As best shown in FIG. 3, thickness 26 of annular lip 22 may be no greater than thickness 28 of planar body 12. In other embodiments, thickness 26 of annular lip 22 may be equal to or greater than thickness 28 of planar body 12.

In some embodiments, annular lip 24 may be absent. In such embodiments, vertically extending flutes 22 span up to the full extent of inner circumferential wall 20, that is, from a top surface 21 of planar body 12 to a bottom surface 23 of planar body 12.

Planar body 12 of light guide 10 also comprises a pair of cutouts 32. Each cutout 32 is adjacent a corresponding side of aperture 18. Cutouts 32 may extend at least a diameter 34 of aperture 18. In the illustrated embodiment, a width 36 of cutouts 32 is greater than diameter 34 of aperture 18. Cutouts 32 narrow in a distal direction, whereby a point 38 of greatest depth of cutouts 32 may align with a centerline 40 of aperture 18.

In light guide 10, cutouts 32 are triangular. In some embodiments, such as in luminaire 300 shown in FIG. 16, light guide 310 comprises an array of apertures 318, and adjacent cutouts 332 of adjacent apertures 318 join to form a combined cutout 342. As illustrated, where such cutouts 332 are triangular and the combined cutout 342 is diamond shaped. In other embodiments, the cutouts and combined cutouts may be any suitable shape; for example, the cutouts may be curves and the combined cutout may be oval shaped.

Figure 16:
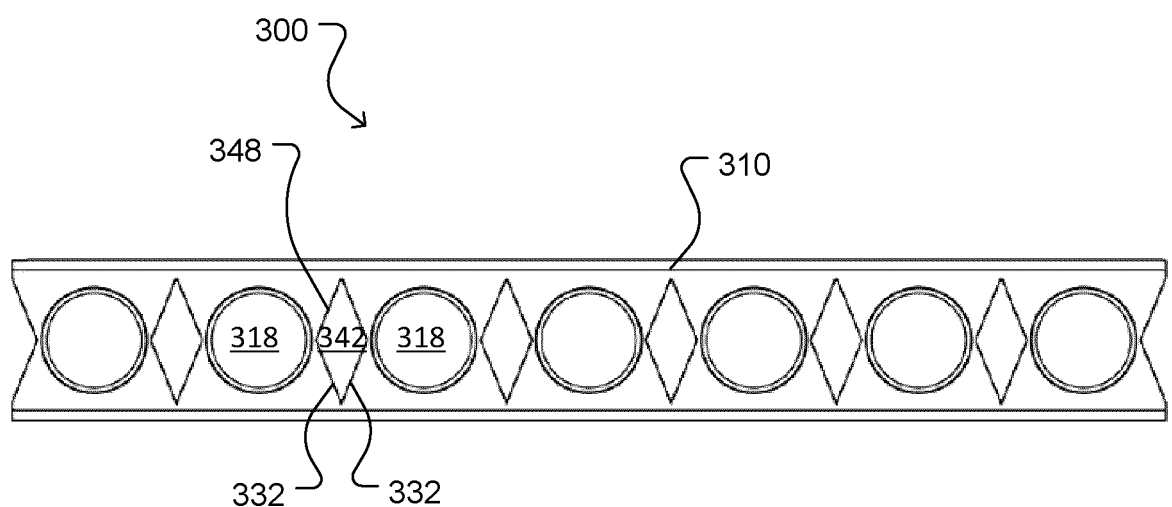
FIG. 16 is a top view of a light guide according to an embodiment.

As shown in FIG. 16, a reflector element 348 may be provided in combined cutouts 342. The shape of reflector element 348 corresponds to the shape of combined cutout 342. Reflector element 348 has reflective sidewalls. Diamond-shaped combined cutouts are also shown in FIGS. 4 and 5.

In operation, substantially all light received at first light receiving surface 14 and second light receiving surface 30 internally reflects through light transmission region 16. The light is compressed by cutouts 32 toward aperture 18 before extraction at vertically extending flutes 22 along inner circumferential wall 20 of aperture 18.

Figure 4:
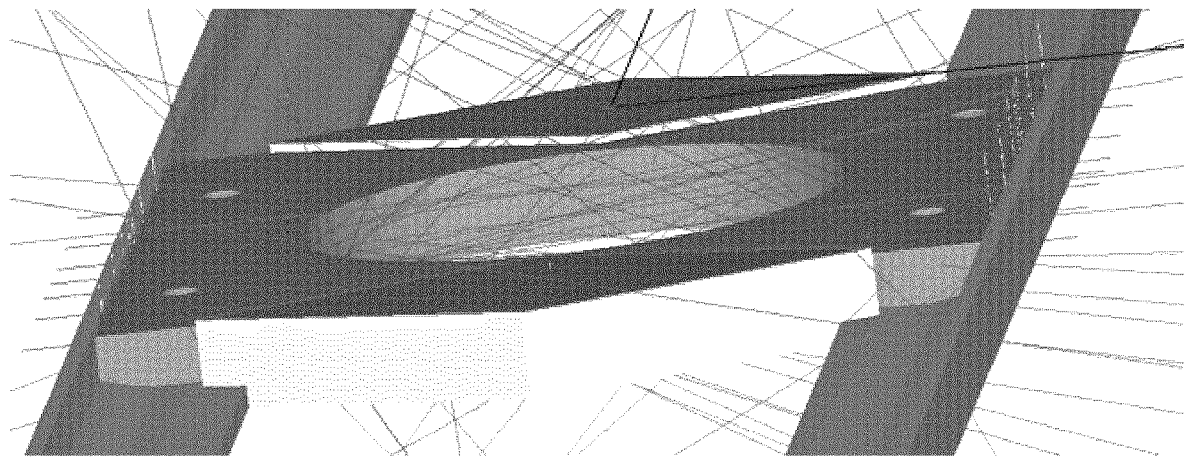
FIG. 4 shows a top isometric view of paths of exemplary light rays emitted out of a light guide according to the embodiment shown in FIG. 1.
Figure 5:
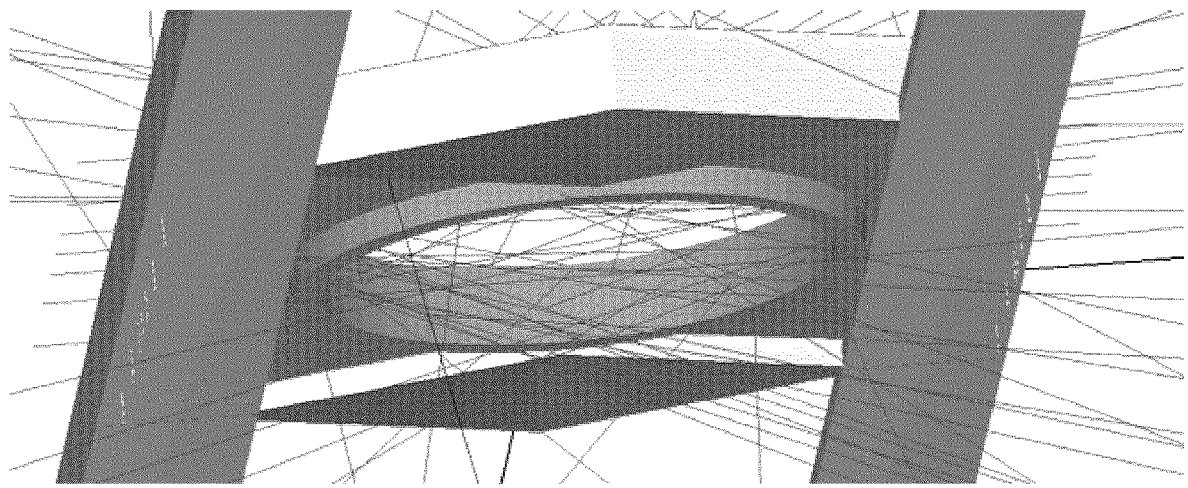
FIG. 5 shows a bottom isometric view of paths of exemplary light rays emitted out of a light guide according to the embodiment shown in FIG. 1.
Figure 6:
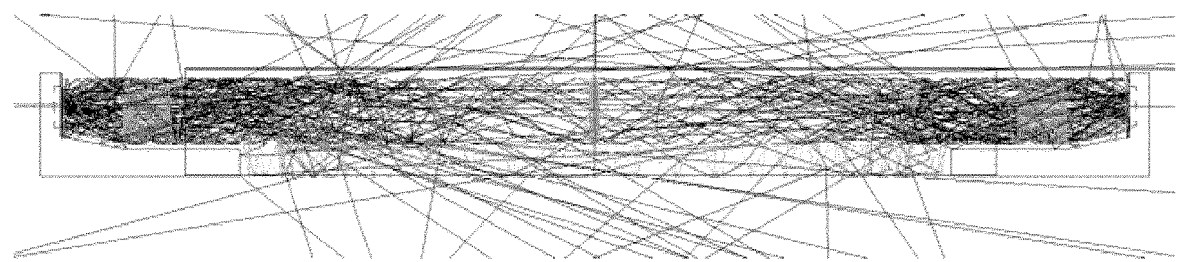
FIG. 6 shows a cross-sectional side view of paths of exemplary light rays internally reflecting and then emitted out of a light guide according to the embodiment shown in FIG. 1.
Figure 7:
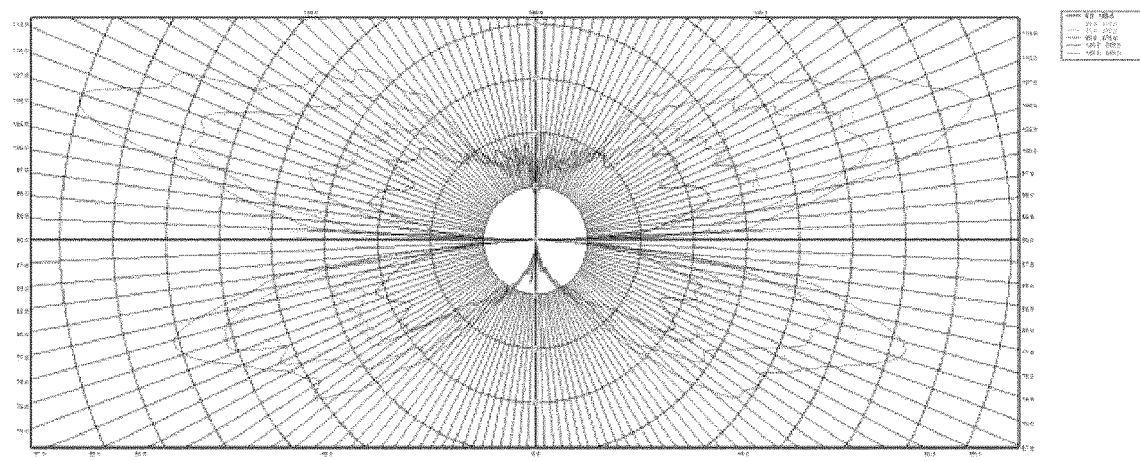
FIG. 7 is an optical distribution plot of light emitted at various luminous intensities from the embodiment shown in FIG. 1 in accordance with FIGS. 4 to 6.

FIGS. 4 to 6 show exemplary simulated multiple ray traces of light reflected within and emitted from light guide 10 from a top, bottom and side cross-section perspectives respectively. The optical distribution of these reactions is plotted in FIG. 7, showing batwing distributions in both the upper and lower hemispheres.

Figure 8:
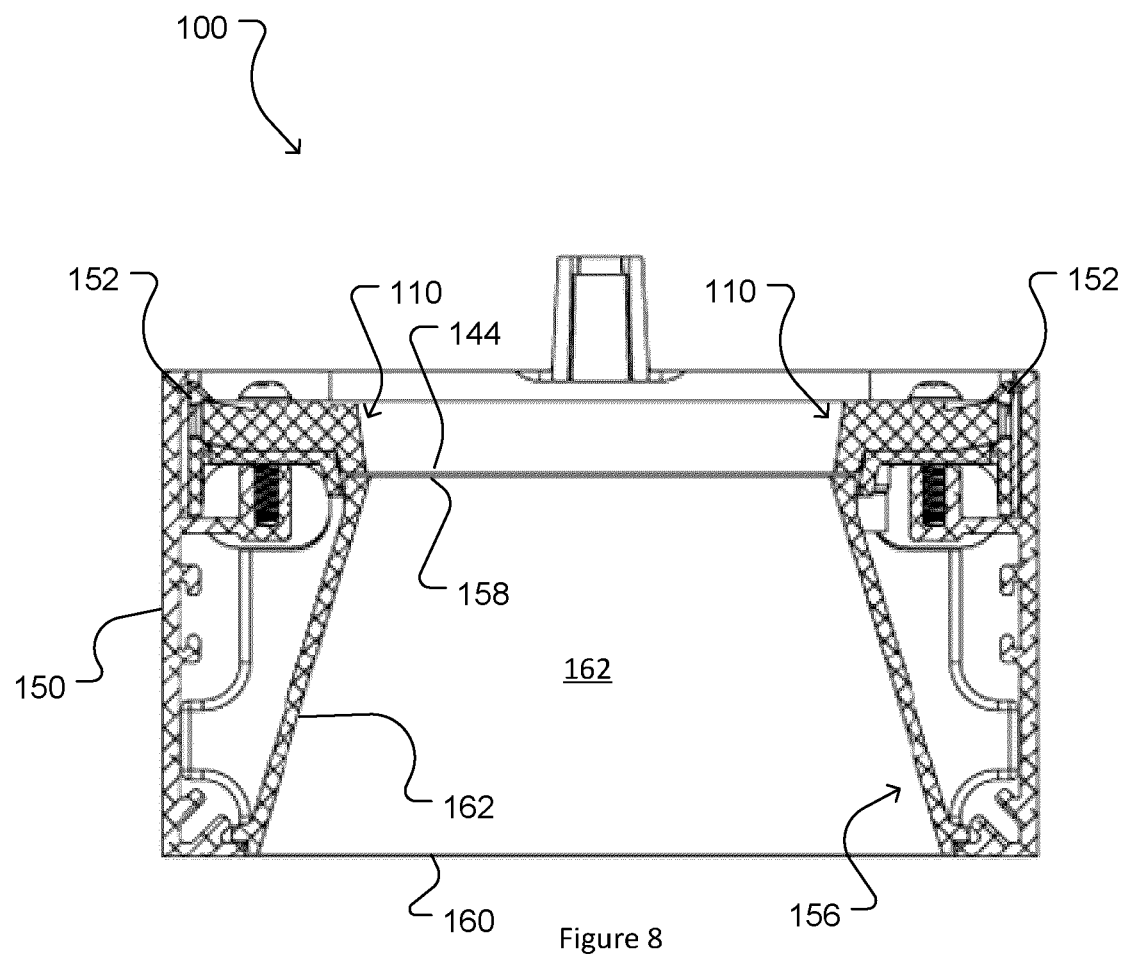
FIG. 8 is a cross-sectional side view of a luminaire with a light guide according to an embodiment.
Figure 9:
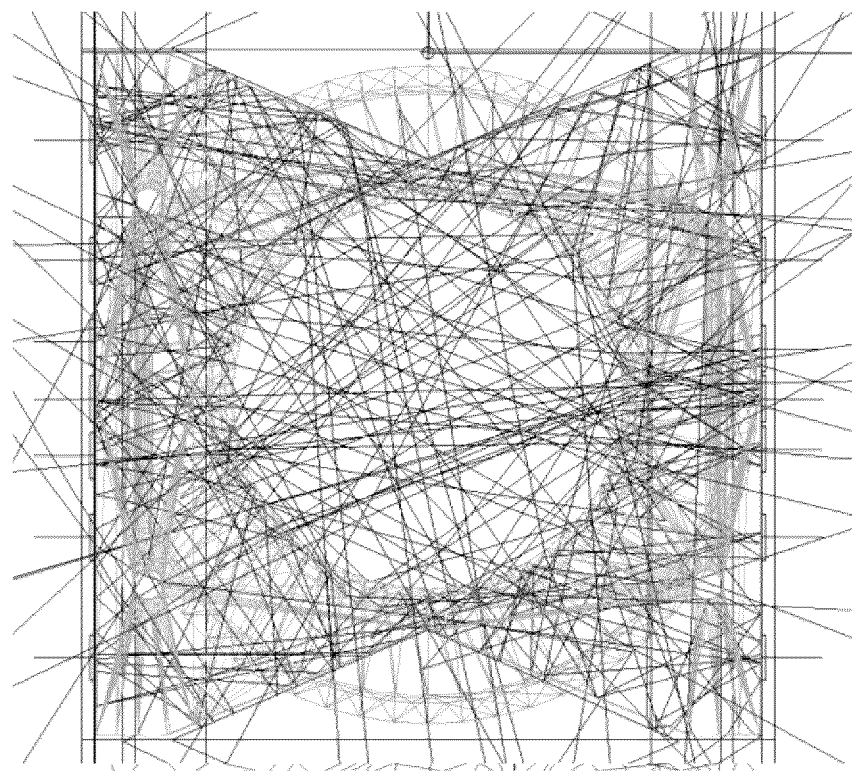
FIG. 9 is a top view of paths of exemplary light rays emitted out of a light guide according to the embodiment shown in FIG. 8.
Figure 10:
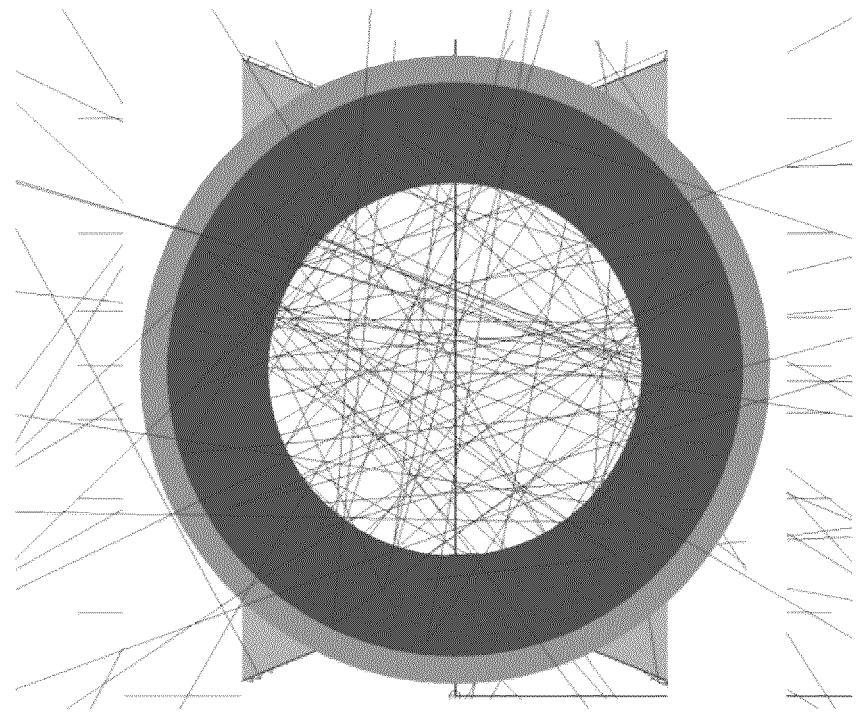
FIG. 10 is a bottom view of paths of exemplary light rays emitted out of a light guide according to the embodiment shown in FIG. 8.

FIG. 8 shows a luminaire 100 with a light guide 110 according to an embodiment. Housing 150 houses light guide 110, light sources 152 and cup 156. Light guide 110 is similar to light guide 10, and receives light from light sources 152.

Cup 156 is coupled to light guide 110. Cup 156 has a top surface 158 and a bottom surface 160. A bottom surface 144 of light guide 110, for example the bottom of annular lip of the aperture or the bottom surface of the planar body, abuts top surface 158 of cup 156. In some embodiments cup 156 may be attached to bottom surface 144 of light guide 110.

Cup 156 comprises a reflective inner wall 162. Reflective inner wall 162 may be diffuse or glossy, and for example may have a reflective white surface.

The shape of top surface 158 of cup 156 may correspond to the shape of the inner circumferential wall of the aperture. The cross-section of cup 156 increases in a direction away from the aperture. The shape of top surface 158 of cup 156 may be the same as a shape of bottom surface 160 cup 156.

For example, cup 156 may have a hollow truncated cone shape. In other embodiments, the shape of the top surface of the cup may be different same from the shape of the bottom surface of the cup, as illustrated in FIGS. 13 to 15.

In operation, light travels from the light sources 152 through light guide 110 as described above for light guide 10. Unlike light guide 10, however, cup 156 interferes with high angle light released downwardly by light guide 110.

Figure 12:
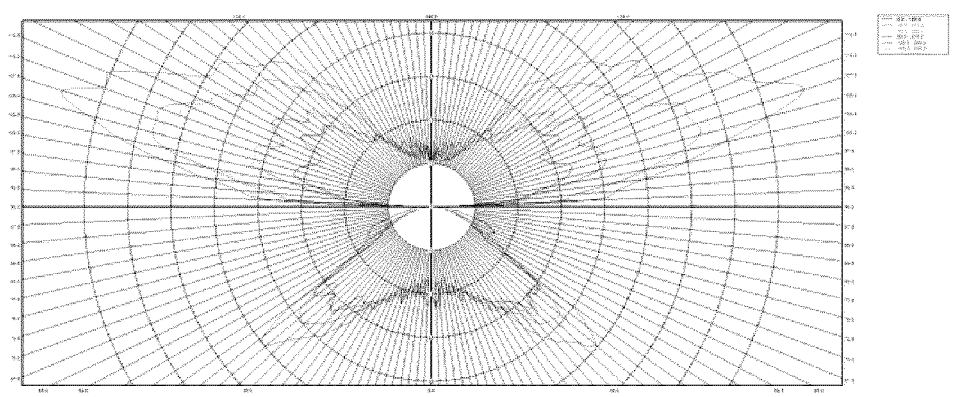
FIG. 12 is an optical distribution plot of light emitted at various luminous intensities from the embodiment shown in FIG. 8 in accordance with FIGS. 9 to 11.

FIGS. 9 to 11B show exemplary simulated multiple ray traces of light reflected within and emitted from luminaire 100 from a top, bottom and full side cross-section, and half side cross-section perspectives respectively. The optical distribution of these reactions is plotted in FIG. 12, showing desirable batwing distributions in both the upper and lower hemispheres, with undesirable higher angle light blocked (by the cup) in the lower hemisphere.

Figure 17:
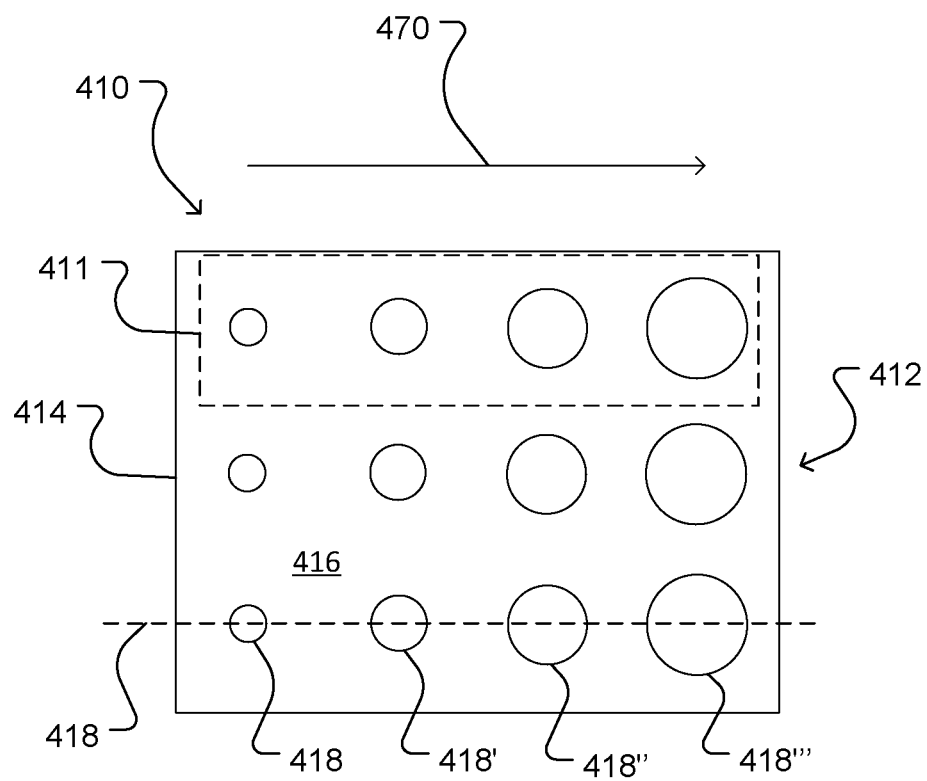
FIG. 17 is a top view of a light guide according to an embodiment.
Figure 18:
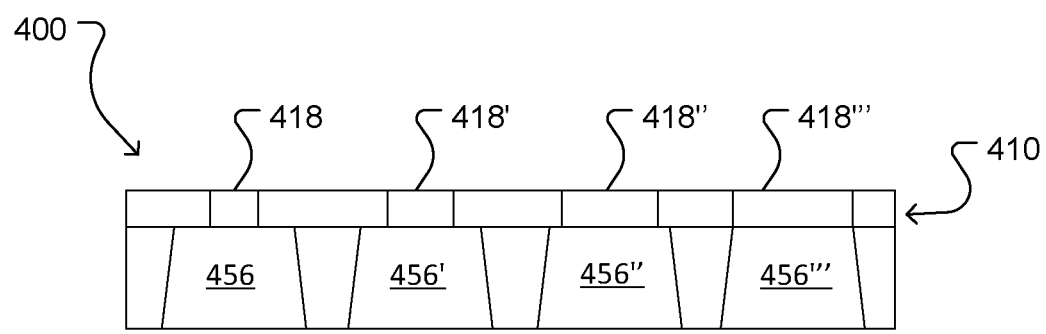
FIG. 18 is a cross-sectional side view of a light guide according to the embodiment shown in FIG. 17.

FIGS. 17 and 18 illustrates a luminaire 400 according to another embodiment. Luminaire 400 has a light guide 410 having a planar body 412, first light receiving surface 414, light transmission region 416 and aperture arrays 411. Each array 411 has multiple apertures 418, 418', 418", 418''' which increase in size in distal direction 470 and are aligned along a centerline 418 of the apertures. The increase in size in distal direction 470 allows for more even distribution of light, allowing apertures further from first light receiving surface 414 to gather more light in an area where relatively less light reaches (due to light being extracted by more proximal apertures). In other embodiments, arrays 411 may have a fewer or greater number of apertures. Each aperture 418, 418', 418", 418''' is coupled to a corresponding cup 456, 456', 456", 456''' in a manner described above with cup 156.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A luminaire comprising: a housing; a light guide comprising: a planar body comprising: light receiving surfaces at opposing outer sides of the planar body; a light transmission region in optical communication with the first light receiving surface; an array of apertures, each comprising an inner circumferential wall defining a light emission region, the inner circumferential wall comprising a plurality of vertically extending flutes; whereby substantially all light received at the light receiving surface internally reflects through the transmission region before extraction at the emission region; a plurality of point light sources in optical communication with the light receiving surfaces of the light guide; wherein a bottom surface of the aperture is coupled to a cup, wherein the cup comprises a reflective inner wall, wherein the planar body comprises a pair of cutouts, each cutout adjacent a corresponding side of an aperture, wherein a cutout of an aperture and a cutout of an adjacent aperture join to form a combined cutout, wherein the individual cutouts are triangular and the combined cutout is diamond shaped.

2. A luminaire according to claim 1 wherein when the light guide comprises a cutout, the luminaire further comprises a reflector element that corresponds in shape and fits in to the cutout, wherein the reflector element comprises reflective sidewalls.

3. A luminaire according to claim 1 wherein a shape of the top surface of the cup corresponds to the shape of the inner circumferential wall of the aperture.

4. A luminaire according to claim 1 wherein a cross-section of the cup increases in a direction away from the aperture.

5. A luminaire according to claim 1 wherein the shape of the top surface of the cup is the same as a shape of the bottom surface of the cup.

6. A luminaire according to claim 1 wherein the cup has a hollow truncated cone shape.

7. A luminaire according to claim 1 wherein the shape of the top surface of the cup is different same from a shape of the bottom surface of the cup.

8. A luminaire according to claim 1 wherein the inner circumferential wall consists of a plurality of vertically extending flutes.

9. A luminaire according to claim 1 wherein the aperture is circular.

10. A luminaire according to claim 1 wherein the aperture comprises an annular lip extending beyond a plane of the bottom surface of the planar body, the annular lip extending the inner circumferential wall and the plurality of vertically extending flutes of the aperture.

11. A luminaire according to claim 1 wherein a thickness of the annular lip is no greater than the thickness of the planar body.

12. A luminaire according to claim 1 wherein the light guide comprises a second light receiving surface opposite the first light receiving surface, whereby the aperture is disposed between the first light receiving surface and the second light receiving surface.

13. A luminaire according to claim 1 wherein the planar body comprises a pair of cutouts, each cutout adjacent a corresponding side of the aperture.

14. A luminaire according to claim 1 wherein the planar body comprises a plurality of apertures.

15. A luminaire according to claim 13 wherein a width of the cutouts is equal to or greater than a diameter of the aperture.

16. A luminaire according to claim 13 wherein the width of the cutouts is greater than the diameter of the aperture.

17. A luminaire according to claim 13 wherein the cutouts narrow in a distal direction, whereby a point of greatest depth of the cutouts aligns with a centerline of the aperture.

18. A luminaire according to claim 13 wherein the cutouts are triangular.

19. A luminaire according to claim 14 wherein the plurality of apertures are aligned along a center point of the apertures.

20. A luminaire according to claim 19 wherein the plurality of apertures are arranged in increasing size in the distal direction.

* * * * *